(12) United States Patent
Hotta (10) Patent No.: US 11,118,532 B2
(45) Date of Patent: Sep. 14, 2021

(54) SPARK-IGNITED INTERNAL COMBUSTION ENGINE

(71) Applicant: TOYOTA JIDOSHA KABUSHIKI KAISHA, Aichi-ken (JP)

(72) Inventor: Shintaro Hotta, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 111 days.

(21) Appl. No.: 16/664,949

(22) Filed: Oct. 28, 2019

(65) Prior Publication Data

US 2020/0158045 A1 May 21, 2020

(30) Foreign Application Priority Data

Nov. 15, 2018 (JP) .............................. JP2018-214529

(51) Int. Cl.
*F02F 3/14* (2006.01)
*F02F 3/26* (2006.01)
*F01P 3/00* (2006.01)
*F02B 23/06* (2006.01)
*F16J 1/00* (2006.01)

(52) U.S. Cl.
CPC .................. *F02F 3/14* (2013.01); *F02F 3/26* (2013.01); *F01P 2003/006* (2013.01); *F02B 23/0621* (2013.01); *F05C 2251/048* (2013.01); *F16J 1/00* (2013.01)

(58) Field of Classification Search
CPC .......... F02F 3/14; F02F 3/26; F01P 2003/006; F02B 23/0621; F05C 2251/048
USPC ....................................................... 123/193.6
See application file for complete search history.

(56) References Cited

U.S. PATENT DOCUMENTS

| | | | | |
|---|---|---|---|---|
| 5,065,706 A | * | 11/1991 | Zvonkovic | ............ F02F 3/0069 |
| | | | | 123/193.6 |
| 2015/0107559 A1 | * | 4/2015 | Bowing | .............. F02B 23/0639 |
| | | | | 123/47 R |
| 2016/0245224 A1 | * | 8/2016 | Ruona | ....................... C23C 4/08 |

FOREIGN PATENT DOCUMENTS

JP  2017-115781 A  6/2017

* cited by examiner

*Primary Examiner* — Lindsay M Low
*Assistant Examiner* — Omar Morales
(74) *Attorney, Agent, or Firm* — Hauptman Ham, LLP (57) ABSTRACT

A top surface of the piston includes a first region. A heat shielding film is formed on the first area. The top surface further includes a second region. There is no heat shielding film formed on the second region. Instead, the second area is mirror-finished. The top surface includes a central portion. A valve recess portion is formed on an intake side of the central portion. A squish portion is formed the intake side of the valve recess portion. The first area includes at least the central portion. The second area includes at least the squish portion.

14 Claims, 5 Drawing Sheets

SPARK-IGNITED INTERNAL COMBUSTION ENGINE

CROSS-REFERENCE TO RELATED APPLICATION

The present disclosure claims priority under 35 U.S.C. § 119 to Japanese Patent Application No. 2018-214529, filed on Nov. 15, 2018. The content of the application is incorporated herein by reference in their entirety.

TECHNICAL FIELD

The disclosure relates to a spark-ignited internal combustion engine.

BACKGROUND

JP2017-115781A discloses a spark-ignited internal combustion engine having a heat shielding film on a top surface of a piston of the engine. The heat shielding film includes an anodic oxidation layer. The anodic oxidation layer has a lower thermophysical property in thermal conductivity and thermal capacity per volume than those of a base material of the piston. Therefore, temperature of a region where the heat shielding film is formed (hereinafter also referred to as a "film-formed region") follows that of working gas in a combustion chamber of the engine. That is, in an expansion stroke of the internal combustion engine, the temperature of the film-formed region rises in accordance with that of combustion gas generated in the combustion chamber. Therefore, it is possible to reduce cooling loss.

Further, in an intake stroke of the internal combustion engine, the temperature of the film-formed region decreases in accordance with that of intake air sucked into the combustion chamber. However, it has been found that when the heat shielding film is formed on the entire top surface, the temperatures of the film-formed region may not be lowered sufficiently. For example, when the internal combustion engine is operated in a high-load region continuously, the temperature in the combustion chamber tends to increase. This tendency makes it easier for knocking to occur.

The present disclosure addresses the above described problem, and one object of the present disclosure is to provide a technique capable of suppressing an occurrence of knocking while ensuring following performance of the temperature of the film-formed region to that of the working gas in the combustion chamber.

SUMMARY

A first aspect is a spark-ignited internal combustion engine for solving the above-described problems, and has the following features.

The engine comprises a piston.
The heat shielding film is formed on a part of a top surface of the piston.
The top surface includes a central portion and a periphery portion.
The periphery portion surrounds the central portion.
The periphery portion includes an exhaust periphery portion.
The exhaust periphery portion occupies an exhaust side of the top surface.
The exhaust periphery portion includes a squish portion.
The squish portion constitutes a squish region.
The heat shielding film is formed on the central portion.
The heat shielding film is not formed on the squish portion.
The squish portion is a mirror-finished surface having an arithmetic mean roughness of less than 0.3 µm.

A second aspect further has the following features in the first aspect.
The engine further comprises an exhaust valve.
The exhaust periphery portion further includes a valve recess portion.
The valve recess portion is provided to avoid interfering with the exhaust valve.
The heat shielding film is not formed on the valve recess portion.
The valve recess portion is the mirror-finished surface.

A third aspect further has the following features in the first aspect.
The exhaust periphery portion further comprises an edge portion.
The edge portion constitutes an edge of the piston.
The heat shielding film is not formed on the edge portion.
The edge portion is the mirror-finished surface.

A fourth aspect further has the following features in the first aspect.
The periphery portion further includes an intake periphery portion.
The intake periphery portion occupies an intake side of the top surface.
The heat shielding film is further formed on the intake periphery portion.

A fifth aspect further has the following features in the first aspect.
The periphery portion further includes an intake periphery portion.
The intake periphery portion occupies an intake side of the top surface.
The heat shielding film is not formed on the intake periphery portion.
The intake periphery portion is the mirror-finished surface.

A sixth aspect further has the following features in the first aspect.
The internal combustion engine further includes an oil jet.
The oil jet is configured to supply oil to a back surface of the piston.
The oil jet includes a nozzle.
The nozzle is configured to inject oil.
An extension line of an axis line of the nozzle intersects the squish portion when the piston is at TDC.

According to the first to fifth aspects, the heat shielding film is formed on the central portion. Therefore, it is possible to reduce the cooling loss in the expansion stroke. On the other hand, the heat shielding film is not formed on the squish portion, whereas the squish portion is formed as the mirror-finished surface. The mirror-finished surface has a constant heat insulating effect. Therefore, according to the mirror-finished surface, it is possible to reduce the cooling loss. However, unlike the heat shielding film, the mirror-finished surface has little following performance on the temperatures of the working gas in the combustion chamber. Therefore, it is possible to suppress the occurrence of the knocking as compared with a case where the heat shielding film is formed on the squish portion as well as the central portion.

According to the sixth aspect, when the piston is at the TDC, the extension line of the axis line of the nozzle intersects the squish portion. Therefore, it is possible to intensively cool the squish portion using the oil injected to the back surface of the squish portion in the vicinity of the TDC. Therefore, it is possible to enhance the effect to suppress the occurrence of the knocking with the mirror-finished surface.

DESCRIPTION OF EMBODIMENT

Hereinafter, embodiments of the present disclosure will be described referring to the drawings. It should be noted that same sign is attached to same elements in the respective drawings, and duplicate descriptions are omitted. In addition, the present disclosure is not limited to the present embodiments by the following embodiments.

First Embodiment

First, a first embodiment of the present disclosure will be described with reference to FIGS. 1 to 5.

1. Configuration of Internal Combustion Engine

Figure 1:
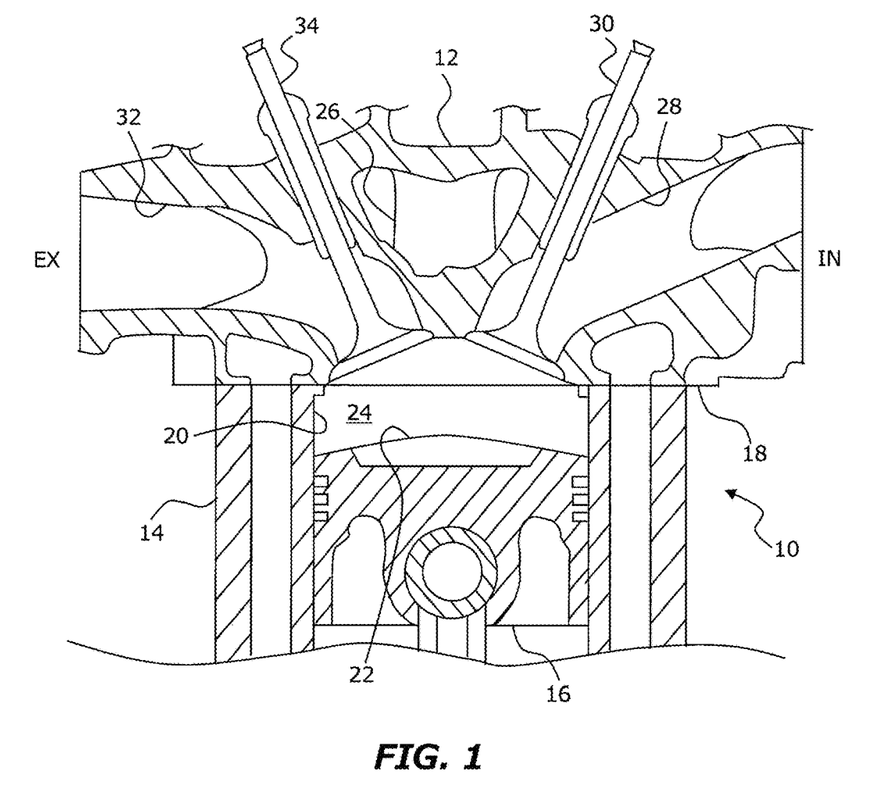
FIG. 1 is a schematic cross-sectional view of a spark-ignited internal combustion engine according to a first embodiment of the present disclosure.

FIG. 1 is a schematic cross-sectional view of a spark-ignited internal combustion engine (hereinafter also referred to as an "engine") according to the first embodiment. The engine 10 shown in FIG. 1 is a four-stroke reciprocating engine mounted on a vehicle.

As shown in FIG. 1, the engine 10 includes a cylinder head 12, a cylinder block 14 and a piston 16. The cylinder head 12 is attached to the cylinder block 14 via a gasket. The piston 16 is housed in a cylinder formed in the cylinder block 14, and moves vertically in the cylinder.

A space enclosed by a bottom surface 18 of the cylinder head 12, an inner circumferential surface 20 of the cylinder block 14 and a top surface 22 of the piston 16 form a combustion chamber 24. In other words, the bottom surface 18, the inner circumferential surface 20 and the top surface 22 constitute a wall surface of the combustion chamber 24. An ignition apparatus 26 is attached to a ceiling portion of the combustion chamber 24.

In the cylinder head 12, intake ports 28 are formed. The intake ports 28 are provided with intake valves 30. When the intake valves 30 are driven, the intake ports 28 and the combustion chamber 24 communicate with each other. Like the intake ports 28, exhaust ports 32 are formed in the cylinder head 12. The exhaust ports 32 are provided with exhaust valves 34.

In FIG. 1, "IN" shown on a right side of the intake ports 28 means an intake side of the engine 10. "EX" shown on a left side of the exhaust ports 32 means an exhaust side of the engine 10. The meanings of "IN" and "EX" are common to other figures.

2. Features of First Embodiment 2.1 First Region R1

The top surface 22 includes a first region R1. A heat shielding film is formed on the region R1. The heat shielding film is composed of, for example, anodic oxidation layer. The anodic oxidation layer is obtained by anodization of a base material (specifically, aluminium alloy) of the top surface 22. The anodic oxidation layer has a plurality of pore opening on its surface. The anodic oxidation layer also has vacancies inside. Some vacancies are connected to the surface pores. Such a structure of the anodic oxidation layer are known.

The heat shielding film may have a sealing layer which seals the surface pores of the anodic oxidation layer. The sealing layer is obtained by coating and drying a silicon-based polymer solution (e.g., polysiloxane solution, polysilazane solution, or the like). Since some of the silicon-based polymer is cured in the surface pores, the sealing layer and the anodic oxidation layer are integrated. Thus, a boundary of these layers are not necessarily clear.

The heat shielding film may be composed of a thermal spraying layer. The thermal spraying layer is obtained by thermal spraying treatment of porous ceramics. In thermal spraying treatment, powders of ceramics such as zirconia, alumina and titania, or powders of complex ceramics such as cermets, mullite, cordierite and steatite are sprayed onto the top surface 22 in a molten state.

As explained above, such a heat shielding film has a lower thermophysical property in thermal conductivity and thermal capacity per volume than that in the base material of piston 16. Therefore, according to the heat shielding film, it is possible for the temperature of the region R1 (i.e., the film-formed region) to follow that of the working gas in the combustion chamber 24.

2.2 Second Region R2

The top surface 22 further includes a second region R2. There is no heat shielding film is formed on the region R2. Instead, the region R2 is mirror finished. Mirror finish is a known process in which abrasives are used to mirror a surface of the base material. As used herein, "mirror-finished surface" means a surface having an arithmetic mean roughness Ra of less than 0.3 μm. The arithmetic mean roughness Ra is measured according to JIS B0601:2013.

The arithmetic mean roughness Ra of the top surface 22 without mirror-finished is 0.3 to several μm. Therefore, according to the top surface 22 including the mirror-finished second region R2, heat of the working gas in the combustion chamber 24 becomes hard to transfer inside of the piston 16. In other words, according to the region R2, heat insulating effect can be expected to a certain degree. However, the top surface 22 including the mirror-finished second region R2 has little following performance on the temperature of the working gas in the combustion chamber 24. In other words, variation range of the temperature in the region R2 is smaller than that in the region R1.

2.3 Example of Regions R1 and R2

2.3.1 First Example

Figure 2:
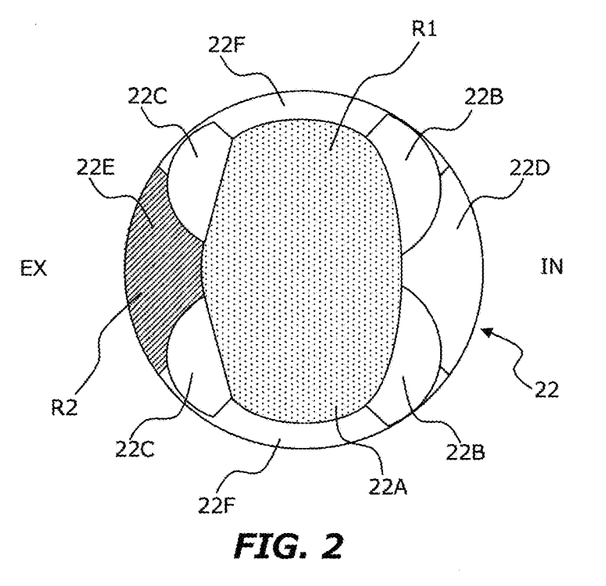
FIG. 2 is a plan view for explaining a first configuration example of a top surface of a piston.

FIG. 2 is a plan view for explaining a first example of the regions R1 and R2. Prior to the explanation of the first example, a configuration of the top surface 22 will be explained. The top surface 22 has an approximately elliptical central portion 22A. On the intake side of the central portion 22A, semicircular valve recess portions 22B are provided. The valve recess portions 22B are provided to avoid interfering with the intake valves 30. Like the valve recess portions 22B, valve recess portions 22C are provided on the exhaust side of the central portion 22A. The valve recess portions 22C are provided to avoid interfering with the exhaust valves 34.

On the intake side of the valve recess portions 22B, a squish portion 22D of gingko leaf shape is provided. Like the squish portion 22D, a squish portion 22E is formed on the exhaust side of the valve recess portions 22C. Squish portions 22D and 22E correspond to squish regions formed between the top surface 22 and the bottom surface 18. The squish portions 22D and 22E are formed flat.

Between the valve recess portions 22B and 22C, edge portions 22F are provided. The edge portions 22F constitute edges of the piston 16. The edge portions 22F are also provided on an outer side of the valve recess portions 22B within the top surface 22. The edge portions 22F are also provided on the outer side of the valve recess portions 22C within the top surface 22. Therefore, the edge portions 22F are connected with the squish portions 22D and 22E.

The valve recess portions 22B and 22C, the squish portions 22D and 22E, and the edge portions 22F constitute a periphery portion of the top surface 22. The periphery portion surrounds the central portion 22A.

In the first example, the region R1 corresponds to the central portion 22A. The region R2 corresponds to the squish portion 22E. The heat shielding film may be provided in other regions except for the regions R1 and R2. The other regions except for the regions R1 and R2 may be mirror-finished. The other regions except for the regions R1 and R2 may not be provided with the heat shielding film or may not be mirror-finished.

2.3.2 Second Example

Figure 3:
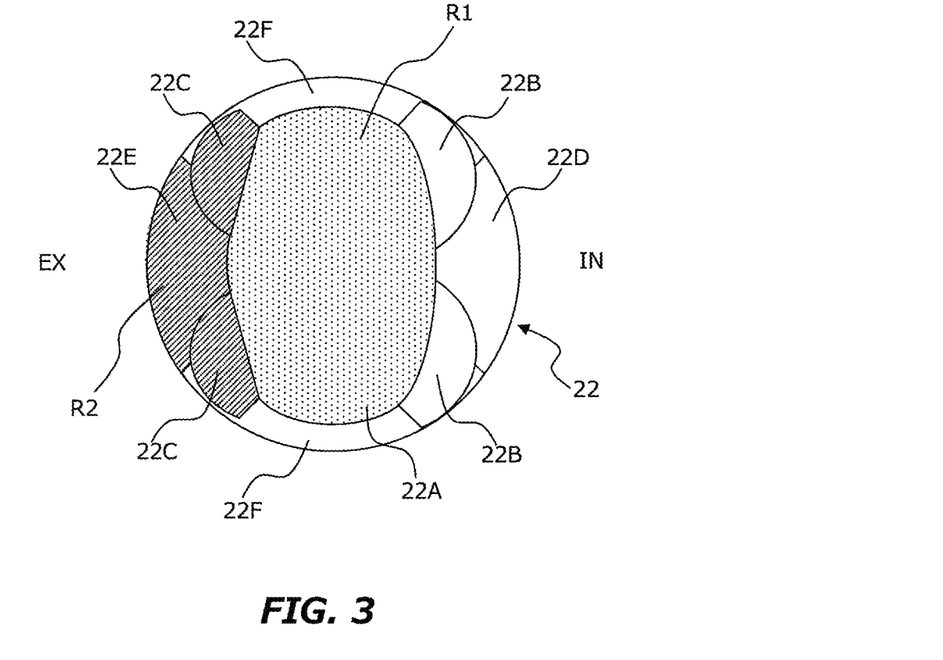
FIG. 3 is a plan view for explaining a second configuration example of the top surface of the piston.

FIG. 3 is a plan view for explaining a second example of the regions R1 and R2. The configuration of the top surface 22 is as described in the first example. In the second example, the region R1 corresponds to the central portion 22A. The region R2 corresponds to the squish portion 22E. Up to this point, the second example is the same as the first example. In the second example, however, the valve recess portions 22C are also corresponds to the region R2. Preferable formation in the other regions except for the regions R1 and R2 are the same as that in the first example.

2.3.3 Third Example

Figure 4:
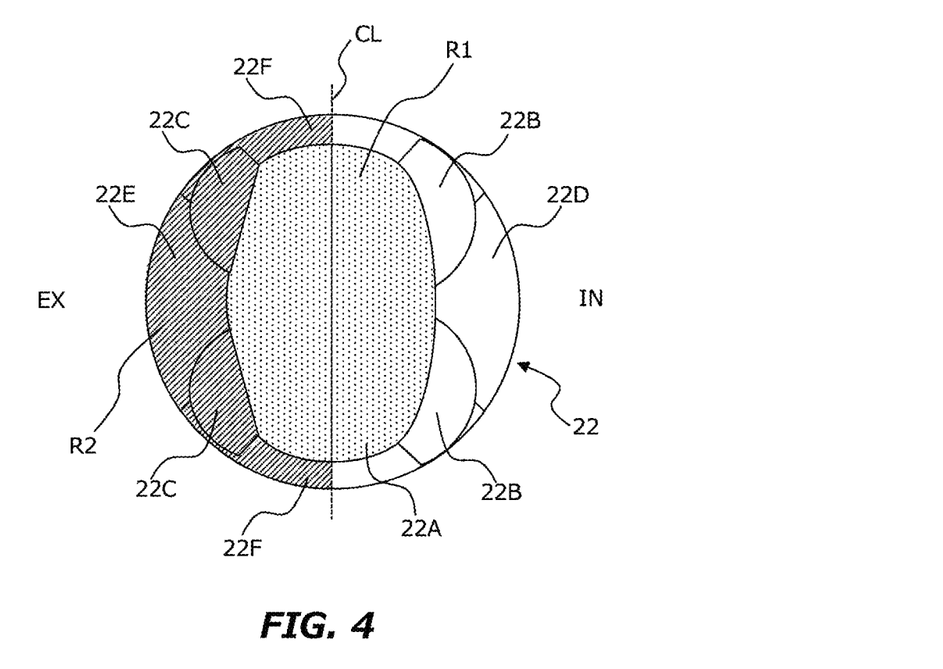
FIG. 4 is a plan view for explaining a third configuration example of the top surface of the piston.

FIG. 4 is a plan view for explaining a third example of the regions R1 and R2. The configuration of the top surface 22 is as described in the first example. In the third example, the region R1 corresponds to the central portion 22A. The region R2 corresponds to the squish portion 22E and the valve recess portions 22C. Up to this point, the third example is the same as the second example. In third example, however, regions at the exhaust side of the edge portions 22F correspond to the region R2. The regions at the exhaust side are regions that occupy more exhaust side than a center line CL. The center line CL is a line through a midpoint of the valve recess portions 22B and 22C. Preferable formation in the other regions except for the regions R1 and R2 are the same as that in the first example.

2.3.4 Fourth Example

Figure 5:
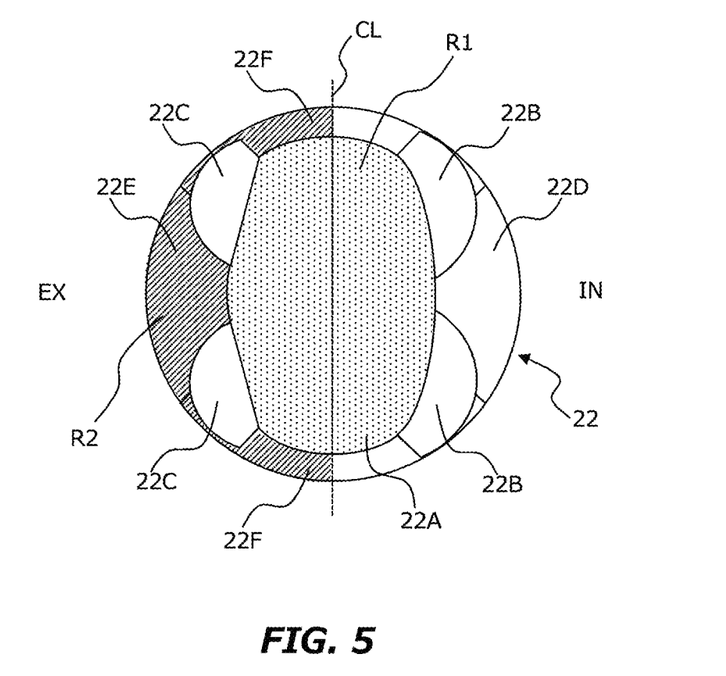
FIG. 5 is a plan view for explaining a fourth configuration example of the top surface of the piston.

FIG. 5 is a plan view for explaining a fourth example of the regions R1 and R2. The configuration of the top surface 22 is as described in the first example. In the fourth example, the region R1 corresponds to the central portion 22A. The region R2 corresponds to the squish portion 22E. Up to this point, the fourth example is the same as the first example. In the fourth example, however, the regions at the exhaust side of the edge portions 22F also correspond to the region R2. Preferable formation in the other regions except for the regions R1 and R2 are the same as that in the first example.

3. Advantageous Effect of First Embodiment

According to the first to fourth examples, the heat shielding film is formed on the central portion 22A. In the expansion stroke of the engine 10, an outer edge of the flame generated in the combustion chamber 24 contacts the central portion 22A. Therefore, in the expansion stroke, the central portion 22A becomes particularly heated in the top surface 22. Therefore, according to the first to fourth examples in which the heat shielding film is formed on the central portion 22A, it is possible to raise the temperature of the central portion 22A in the expansion stroke. Therefore, it is possible to reduce the cooling loss.

According to the first to fourth examples, the heat shielding film is not formed on the squish portion 22E, but the squish portion 22E is mirror-finished. Therefore, a constant heat insulating effect due to the mirror-finished surface can be expected. In addition to the squish portion 22E, when the valve recess portions 22C and/or the exhaust side of the edge portions 22F are mirror-finished, this heat insulating effect can enhanced.

Here, combustion gas generated in the combustion chamber 24 is discharged from the exhaust ports 32 as the exhaust valves 34 are driven. Therefore, in the exhaust stroke of the engine 10, a region in the top surface 22 close to the exhaust ports 32 (i.e., the squish portion 22E), is particularly heated.

Assume that the heat shielding film is formed on the squish portion 22E. In this case, the temperature of the squish portion 22E rises in the exhaust stroke. This makes it difficult to sufficiently lower the temperature of the squish portion 22E even if it follows the temperature of the intake air sucked in the intake stroke. When the engine 10 is operated continuously in a high-load region, there is a possibility that knocking occurs with vicinity of the squish portion 22E as an ignition point.

In this respect, according to the first to fourth examples, the squish portion 22E is mirror-finished. As described above, the top surface 22 including the mirror-finished second region R2 has little following performance on the temperature of the working gas in the combustion chamber 24. Therefore, it is possible to suppress an occurrence of knocking as compared with a case where the heat shielding film is formed on the squish portion 22E. In addition to the squish portion 22E, when the valve recess portions 22C and/or the exhaust side of the edge portions 22F are mirror-finished, this suppressing effect can be enhanced.

In addition, in the first to fourth examples, there is no particular restriction on the formation in the other regions except for the regions R1 and R2. Therefore, it is possible to maximize the heat insulating effect or the suppressing effect described above in accordance with specifications of the engine 10.

4. Correspondence Between First Embodiment and Aspects

In the above first embodiment, the valve recess portions 22C, the squish portion 22E, and the regions at the exhaust side of the edge portions 22F correspond to the "exhaust periphery portion" of the first aspect. The valve recess portions 22B, the squish portion 22D, and regions at the intake side of the edge portions 22F correspond to the "intake periphery portion" of the fourth aspect.

Second Embodiment

Next, a second embodiment of the present disclosure will be described with reference to FIGS. 6 and 7. Note that explanations for the same configuration as those in the first embodiment are omitted as appropriate.

1. Configuration of Internal Combustion Engine

Figure 6:
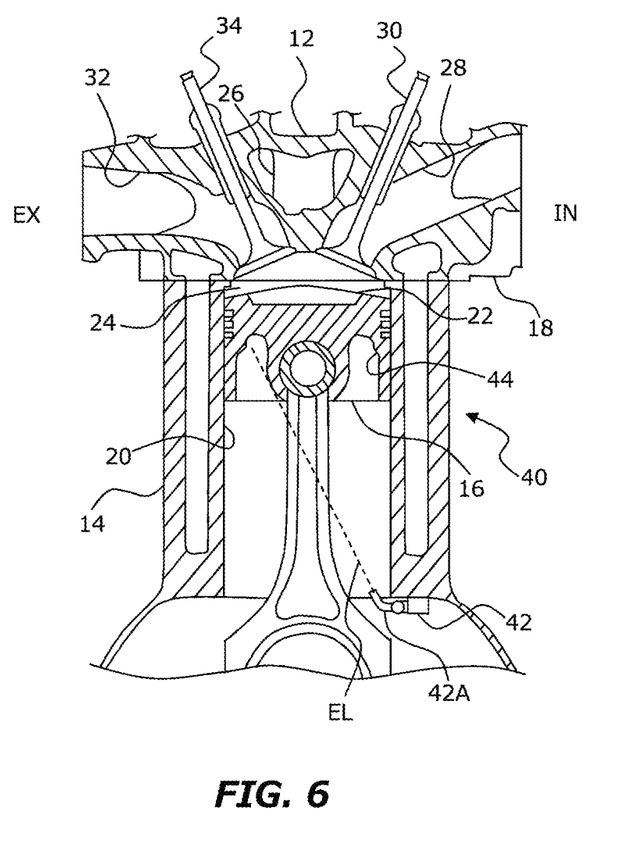
FIG. 6 is a schematic cross-sectional view of the spark-ignited internal combustion engine according to a second embodiment of the present disclosure.

FIG. 6 is a schematic cross-sectional view of the engine according to the second embodiment. The basic configuration of an engine 40 shown in FIG. 6 is the same as that of the engine 10 shown in FIG. 1.

The engine 40 includes an oil jet 42. The oil jet 42 is attached to a lower end of the cylinder block 14. The oil jet 42 is connected to a pump (not shown) which is driven by rotation of the engine 10. When the pump is driven, coolant oil flows into the oil jet 42. The oil jet 42 includes a nozzle 42A. The oil flowing into the oil jet 42 is injected from the nozzle 42A toward a back surface 44 of the piston 16.

2. Features of Second Embodiment

FIG. 6 depicts an extension line EL of an axis of the nozzle 42A. In FIG. 6, the piston 16 locates at the TDC (Top Dead Center). The extension line EL intersects the top surface 22. More specifically, the extension line EL intersects the squish portion 22E described in FIGS. 2 to 5. That is, the nozzle 42A is directed to the squish portion 22E when the piston 16 is at TDC.

Figure 7:
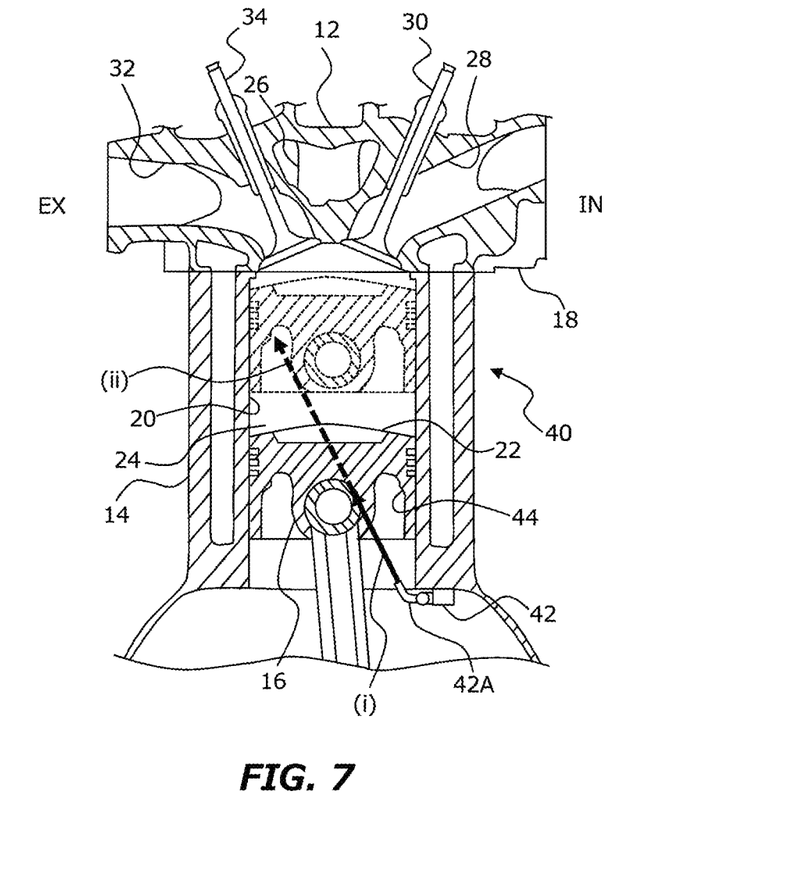
FIG. 7 is a view for explaining an injection spot of oil from an oil jet.

FIG. 7 is a view for explaining an injection spot of oil from the oil jet. In FIG. 7, the piston 16 is located at BDC (Bottom Dead Center). Above the piston 16, a virtual piston located at the TDC is shown in broken line. An arrow (i) indicates a site at which the oil is injected when the piston 16 is at the BDC. This site corresponds to the back surface of the central portion 22A described in FIGS. 2 to 5. An arrow (ii) indicates a site at which the oil is injected when the piston 16 is at the TDC. This site corresponds to the back surface of the squish portion 22E.

3. Advantageous Effect of Second Embodiment

According to the second embodiment, it is possible to cool the back surface of the central portion 22A in the vicinity of the BDC. Therefore, it is possible to cool intensively the central portion 22A which has been heated to the high temperature in the expansion stroke. Especially, in the vicinity of the TDC, it is possible to cool the back surface of the squish portion 22E. Therefore, it is possible to cool intensively the squish portion 22E which has been heated to the high temperature in the exhaust stroke.

As described above, according to the second embodiment, it is possible to reduce effectively the temperature of the squish portion 22E from a latter half of the expansion stroke to a first half of the intake stroke. Therefore, it is possible to enhance the suppressing effect derived from the mirror-finished surface.

What is claimed is:

1. A spark-ignited internal combustion engine comprising;
a piston, and
a heat shielding film which is formed on a part of a top surface of the piston, wherein the top surface includes:
a central portion; and
a periphery portion which surrounds the central portion,
wherein the periphery portion includes an exhaust periphery portion which occupies an exhaust side of the top surface,
wherein the exhaust periphery portion includes a squish portion which constitutes a squish region, wherein:
the heat shielding film is formed on the central portion;
the heat shielding film is not formed on the squish portion; and
the squish portion is a mirror-finished surface having an arithmetic mean roughness of less than 0.3 μm.

2. The engine according to claim 1, further comprising an exhaust valve,
wherein the exhaust periphery portion further includes a valve recess portion which is provided to avoid interfering with the exhaust valve, wherein:
the heat shielding film is not formed on the valve recess portion; and
the valve recess portion is the mirror-finished surface.

3. The engine according to claim 2,
wherein the exhaust periphery portion further comprises an edge portion which constitutes an edge of the piston, wherein:
the heat shielding film is not formed on the edge portion; and
the edge portion is not the mirror-finished surface.

4. The engine according to claim 3, wherein the valve recess portion is between the squish portion and the edge portion.

5. The engine according to claim 2,
wherein the exhaust periphery portion further comprises an edge portion which constitutes an edge of the piston, wherein:
the heat shielding film is not formed on the edge portion; and
the edge portion is the mirror-finished surface.

6. The engine according to claim 1,
wherein the exhaust periphery portion further comprises an edge portion which constitutes an edge of the piston, wherein:
the heat shielding film is not formed on the edge portion; and
the edge portion is the mirror-finished surface.

7. The engine according to claim 6, further comprising an exhaust valve,
wherein the exhaust periphery portion further includes a valve recess portion which is provided to avoid interfering with the exhaust valve, wherein:
the heat shielding film is not formed on the valve recess portion; and
the valve recess portion is not the mirror-finished surface.

8. The engine according to claim 7, wherein the valve recess portion is between the squish portion and the edge portion.

9. The engine according to claim 1,
wherein the periphery portion further includes an intake periphery portion which occupies an intake side of the top surface,
wherein the heat shielding film is further formed on the intake periphery portion.

10. The engine according to claim 1,
wherein the periphery portion further includes an intake periphery portion which occupies an intake side of the top surface, wherein:
the heat shielding film is not formed on the intake periphery portion; and
the intake periphery portion is the mirror-finished surface.

11. The engine according to claim 1, further comprising an oil jet which is configured to supply oil to a back surface of the piston,
wherein the oil jet includes a nozzle which is configured to inject oil,
wherein an extension line of an axis line of the nozzle intersects the squish portion when the piston is at TDC.

12. The engine according to claim 1, further comprising an exhaust valve,
wherein the exhaust periphery portion further includes a valve recess portion which is provided to avoid interfering with the exhaust valve, wherein:
the heat shielding film is not formed on the valve recess portion; and
the valve recess portion is not the mirror-finished surface.

13. The engine according to claim 12,
wherein the exhaust periphery portion further comprises an edge portion which constitutes an edge of the piston, wherein:
the heat shielding film is not formed on the edge portion; and
the edge portion is the mirror-finished surface.

14. The engine according to claim 13, wherein the valve recess portion is between the squish portion and the edge portion.

* * * * *